June 24, 1958 W. M. LEEDS ET AL 2,840,670

CIRCUIT INTERRUPTERS

Filed Dec. 20, 1954 9 Sheets-Sheet 1

WITNESSES

Wm. C. Groome

W. R. Crout

INVENTORS

Robert E. Friedrich, Winthrop M. Leeds and Benjamin P. Baker.

BY

Ralph H. Swingle

ATTORNEY

June 24, 1958 W. M. LEEDS ET AL 2,840,670

CIRCUIT INTERRUPTERS

Filed Dec. 20, 1954 9 Sheets-Sheet 2

June 24, 1958 W. M. LEEDS ET AL 2,840,670

CIRCUIT INTERRUPTERS

Filed Dec. 20, 1954 9 Sheets-Sheet 4

June 24, 1958 W. M. LEEDS ET AL 2,840,670

CIRCUIT INTERRUPTERS

Filed Dec. 20, 1954 9 Sheets-Sheet 5

June 24, 1958 W. M. LEEDS ET AL 2,840,670

CIRCUIT INTERRUPTERS

Filed Dec. 20, 1954 9 Sheets-Sheet 6

June 24, 1958 W. M. LEEDS ET AL 2,840,670

CIRCUIT INTERRUPTERS

Filed Dec. 20, 1954 9 Sheets-Sheet 8

United States Patent Office 2,840,670 Patented June 24, 1958

2,840,670

CIRCUIT INTERRUPTERS

Winthrop M. Leeds, Forest Hills, Benjamin P. Baker, Monroeville, and Robert E. Friedrich, Baldwin Boro, Pa., assignors to Westinghouse Electric Corporation, East Pittsburgh, Pa., a corporation of Pennsylvania Application December 20, 1954, Serial No. 476,108

10 Claims. (Cl. 200—145)

This invention relates to circuit interrupters in general, and, more particularly, to arc-extinguishing structures having voltage-distributing means associated therewith.

In the transmission of currents at high voltages, for example up to 330 kv. and more, and with the interrupters which are customarily used for these applications involving a plurality of serially related breaks, it is important to provide good voltage distribution at both low and high frequencies between the multiple breaks, so that each break will be forced to assume its proportionate burden in interrupting the circuit and withstanding subsequent voltage surges. For instance, there is the distinct possibility that multiple lightning stroke conditions near the interrupters may apply successive surges after arc interruption and before the breaker contacts are fully opened. Consequently, it is very important in achieving rapid interruption and maintaining dielectric strength, even in the face of adverse conditions involving multiple lightning strokes, for the breakers, or interrupters, to be equipped with suitable voltage-distribution means over the plurality of breaks so that adequate voltage control is obtained during both low and high frequency application of surge voltages. It is, therefore, a general object of our invention to provide an improved voltage-distribution means for circuit interrupters, particularly suitable for those interrupting the higher voltages, which will function to control the voltage between the breaks and bring about increased effectiveness during the interrupting operations.

Another object is to provide voltage-distribution means in a circuit interrupter so that each of two serially-related arc-extinguishing assemblages will have approximately the same amount of voltage thereacross during the interruption process.

Another object of our invention is to provide improved means for assembling the shunting impedance means along the interrupting assemblies so that a minimum amount of space is required, and the mechanical operation of the interrupter is not adversely affected.

A further object of our invention is to provide an improved voltage distribution means for the arc-extinguishing assemblage of a circuit interrupter in which tapped connections may readily be made between the individual breaks and portions or sections of the shunting impedance means.

Yet a further object of our invention is to provide an improved capacitor unit, which will be particularly suitable for use in liquid-break circuit interrupters, such, for example, as those using oil as the arc-extinguishing medium.

Yet a further object of our invention is to provide an improved bracket means for supporting the shunting impedance elements of a circuit interrupter having voltage control, whereby the impedance means may easily be dismantled and a similar impedance means may be substituted therefor, without necessitating a dismantling of the breaker parts.

Still a further object of our invention is to provide a combination of resistance and capacitance impedance units across a plurality of individual breaks in a multibreak circuit interrupter, and to provide a lower impedance or a higher capacitance across the end breaks than is used across the intervening breaks to bring about improved voltage control.

Still a further object of our invention is to provide the shunting impedance means for an arc-extinguishing assemblage for the purpose of voltage control in the form of a plurality of tubular elements extending substantially parallel to one another.

An ancillary object of our invention is to provide the impedance means specified in the immediately preceding paragraph in a form such that the ends of the tubular elements may be secured to a pair of bracket members with flexibility to absorb mechanical shocks during fault interrupting duty, the bracket members being readily attached adjacent the ends of a circuit interrupter assemblage.

Still another object of our invention is to provide one or more tubular impedance elements associated with the arc-extinguishing assemblage of a circuit interrupter having improved means for tapping off one or more sections of such impedance elements across the individual breaks for maintaining the individual contacts at a desired potential.

Further objects and advantages will readily become apparent upon reading the following specification, taken in conjunction with the drawings in which.

Figure 1:
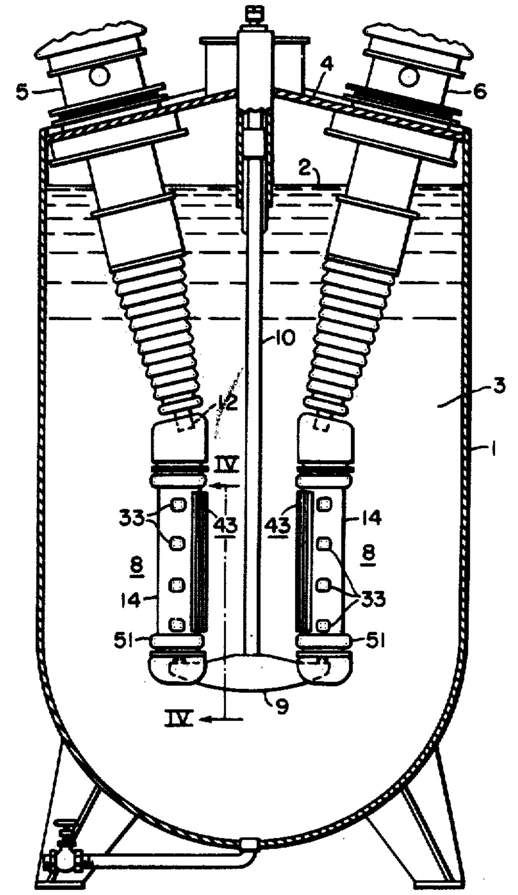
Figure 1 is a side elevational view, partially in vertical section, of one pole of a circuit interrupter embodying our invention, the contact structure being illustrated in the closed-circuit position.
Figure 4:
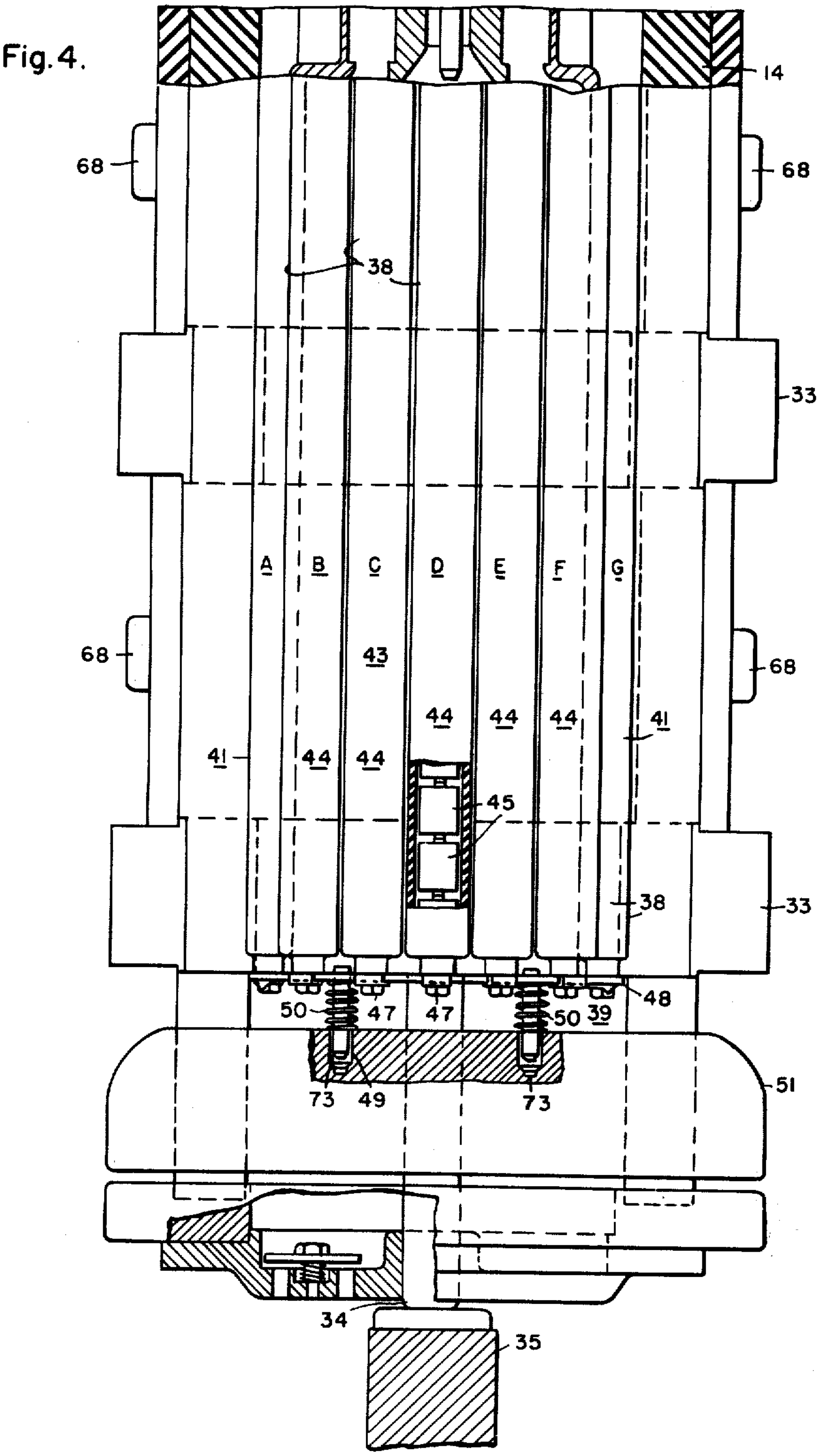
Fig. 4 is a side elevational view, partially in section, of the arc-extinguishing assemblage of Figs. 2 and 3 taken in a direction indicated by the arrows and lines IV—IV of Fig. 1, the contact structure being shown in the closed-circuit position.
Figure 9:
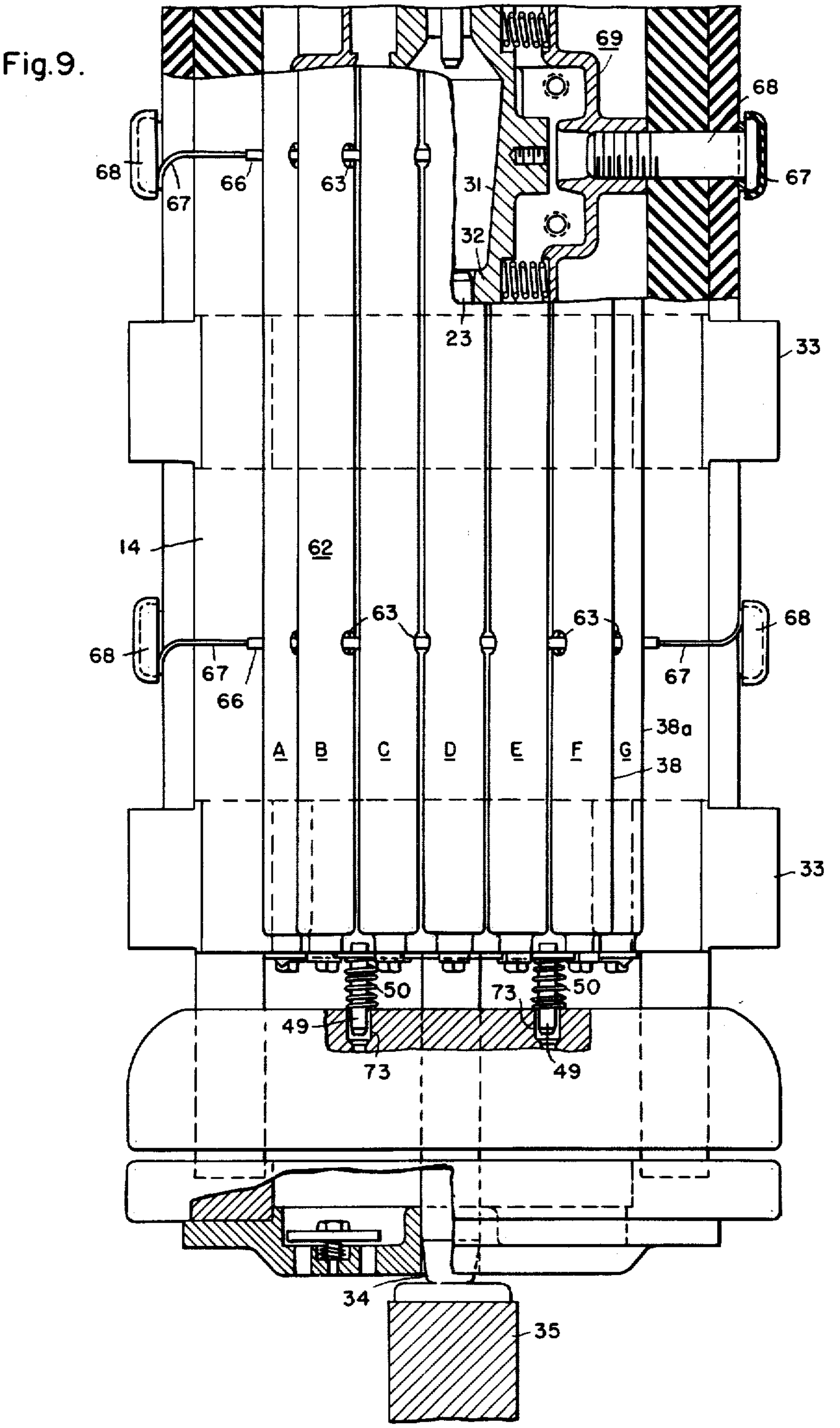
Figures 10, 11, 12, 13, 14:
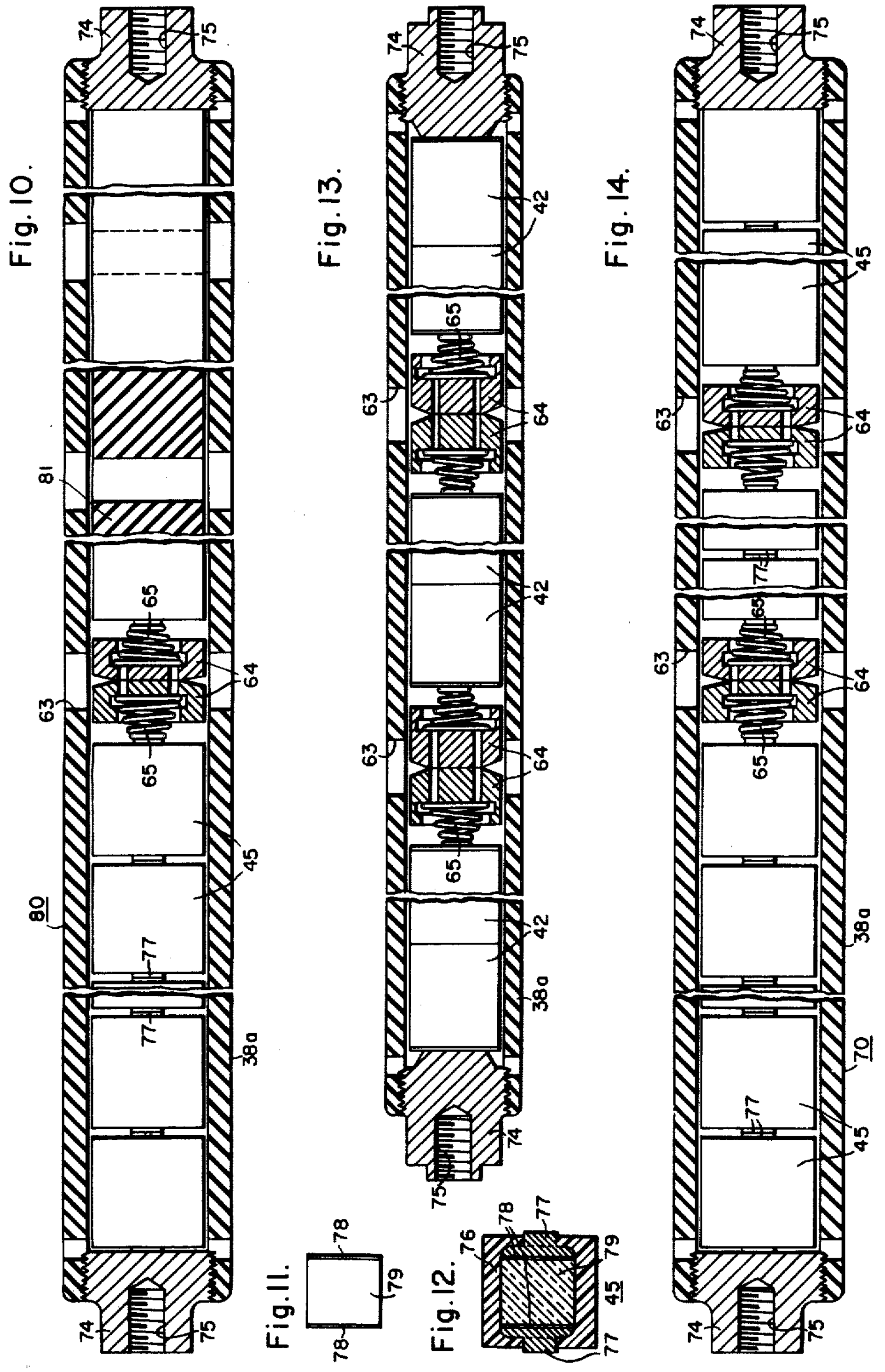
Figures 15, 16:
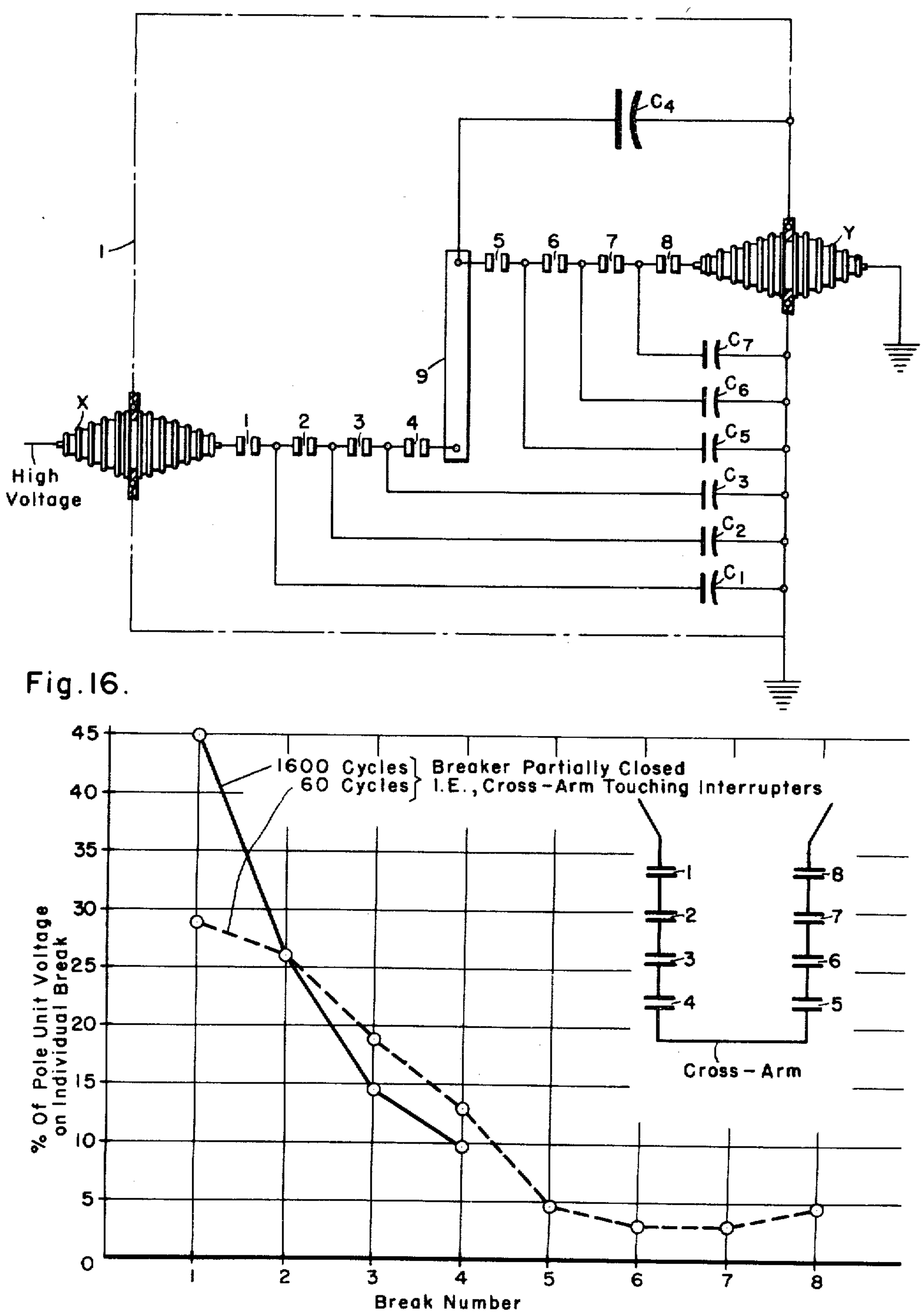
Figure 17:
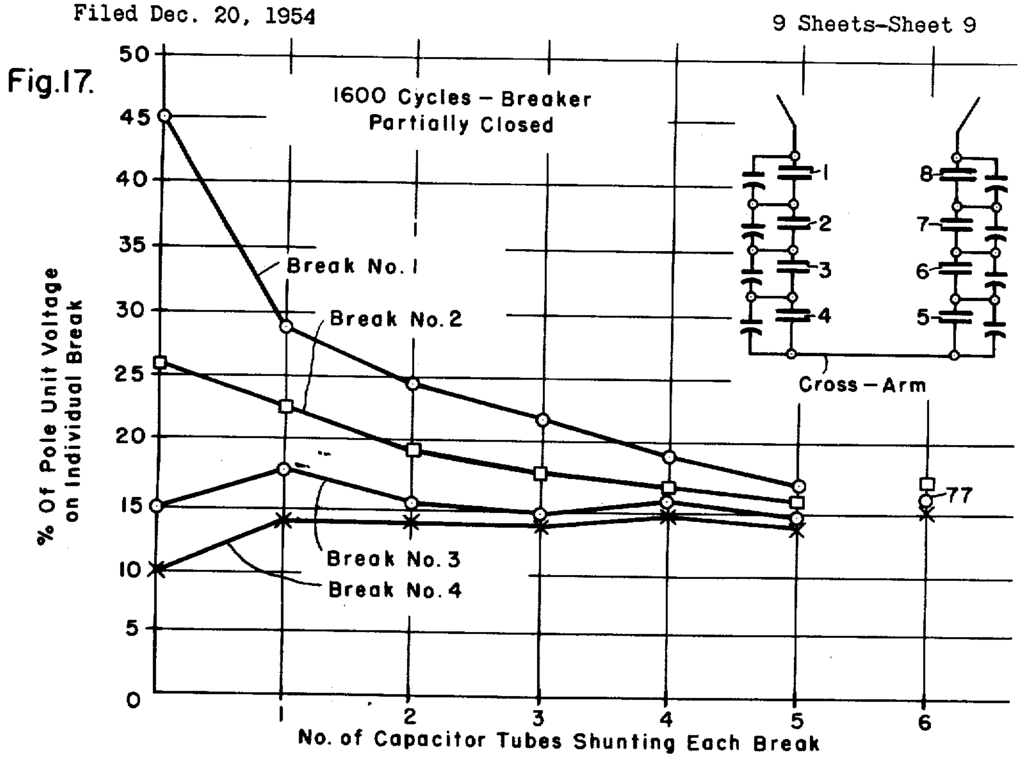
Figure 18:
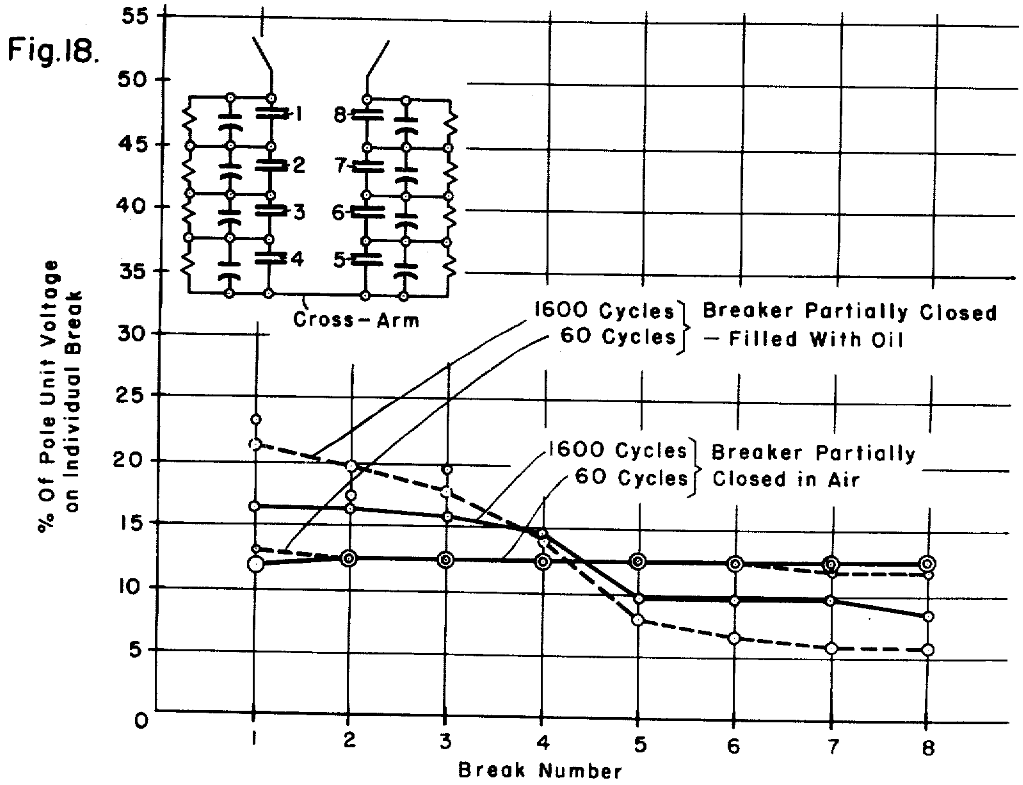

Fig. 9 is a view similar to that of Fig. 4, but illustrating a modified type of shunting impedance means of the same general type as heretofore illustrated, but illustrating an improved impedance tapping construction, whereby suitable proportions of the impedance elements may be shunted across the individual interrupting units of the arc-extinguishing assemblage, again the contact structure being illustrated in the closed-circuit position;

Fig. 10 is an enlarged, fragmentary, cross-sectional view taken through a capacitance impedance element, utilized in position 4 in the construction illustrated in Fig. 9, whereby additional capacitance may be shunted across the outer end breaks of the two arc-extinguishing assemblages of Fig. 1;

Fig. 11 is a side elevational view of one of the individual ceramic capacitor blocks used in the tubular capacitance elements of our invention without its plastic enclosing casing;

Fig. 12 is a cross-sectional view through one of the complete, incased, capacitance blocks;

Fig. 13 is a view similar to that of Fig. 10 but illustrating a fragmentary, longitudinal cross-sectional view through a resistance element, incorporating resistance blocks, and disposed at the outside ends in positions 1 and 7 of the shunting impedance assembly illustrated in Fig. 9;

Fig. 14 is a view similar to that of Figs. 10 and 13 but illustrating a fragmentary, longitudinal, cross-sectional view of a tubular capacitance element having provision for tapping off across all of the arc-extinguishing units, and being situated in positions 2, 3, 5, 6 of the shunting impedance assembly illustrated in Fig. 9;

Fig. 15 is a diagrammatic view illustrating the inherent capacitance coupling between the several contact elements and the bridging cross-bar and the grounded tank of a circuit interrupter embodying two arc-extinguishing assemblages, such as illustrated in Fig. 1, the capacitance being illustrated at the time the multiple contacts are opened, the circuit having just been interrupted, but yet the cross-bar not having separated from the lower ends of the assemblages;

Fig. 16 is a graph showing the percentage of total test pole-unit voltage across particular breaks when the breaker, with no special voltage distributing means, is partially closed, the cross-arm touching the interrupters, and test voltage applied to the breaker terminals;

Fig. 17 illustrates a graph showing the effect of using various values of shunting capacitance across the individual breaks on the proportion of voltage assumed by certain breaks of the total applied pole-unit voltage; and Fig. 18 is a graph showing the distribution of voltage across the various breaks in terms of percentage of total pole-unit voltage at two different frequencies utilizing the shunting impedance assemblage illustrated in Fig. 9 of the drawings.

Referring to the drawings, and more particularly to Fig. 1 thereof, the reference numeral 1 designates a tank filled to the level 2 with a suitable arc-extinguishing fluid 3, in this particular instance circuit breaker oil. Depending from a cover structure 4 are a pair of high-voltage terminal bushings 5, 6, to the lower interior ends of which are secured, and clamped, and pair of arc-extinguishing assemblages, generally designated by the reference numeral 8.

The two serially related arc-extinguishing assemblages 8 are electrically interconnected by a conducting bridging cross-arm 9 actuated vertically, in a reciprocal manner, by an insulating lift rod 10.

Figure 2:
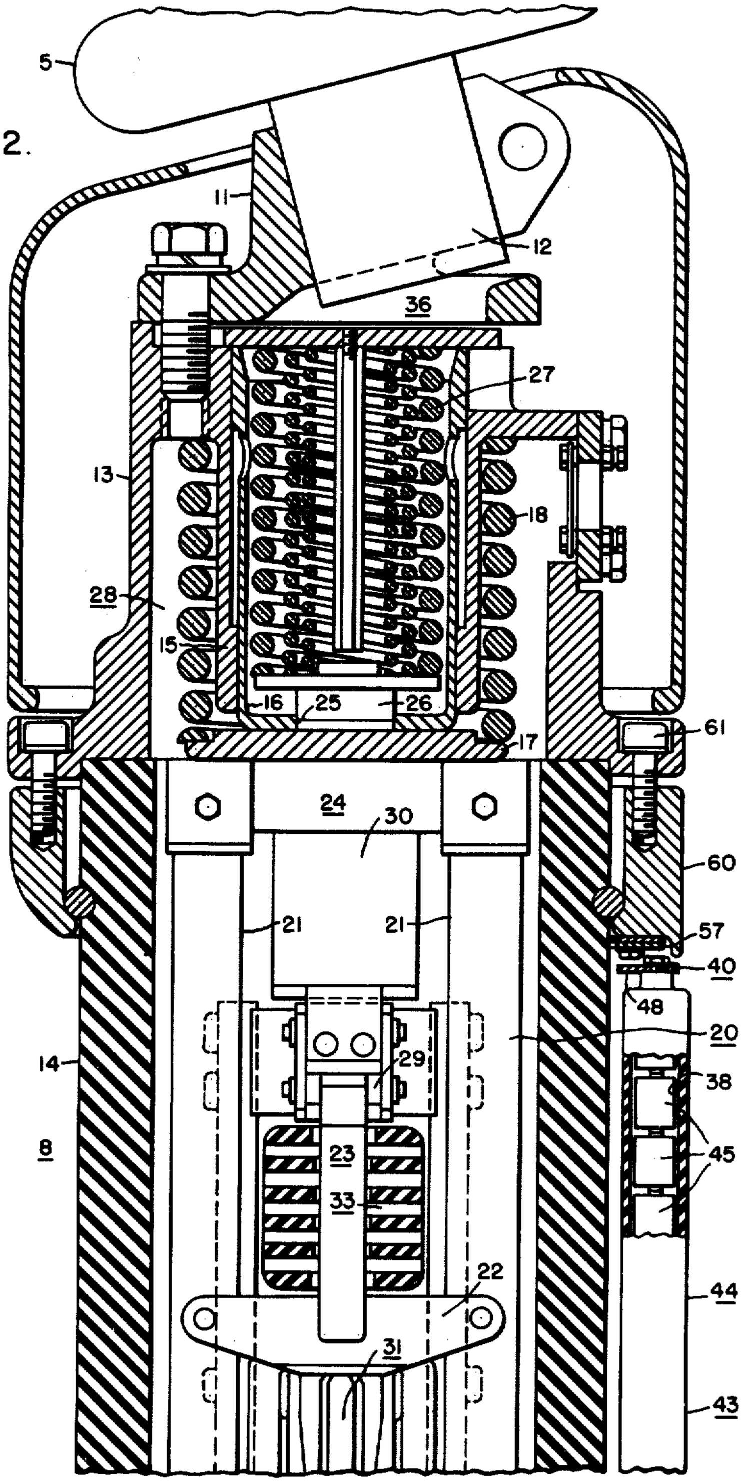
Fig. 2 is a considerably enlarged, fragmentary, vertical sectional view through the upper portion of the left-hand arc-extinguishing assemblage of Fig. 1, the contact structure being shown in the closed-circuit position.
Figure 3:
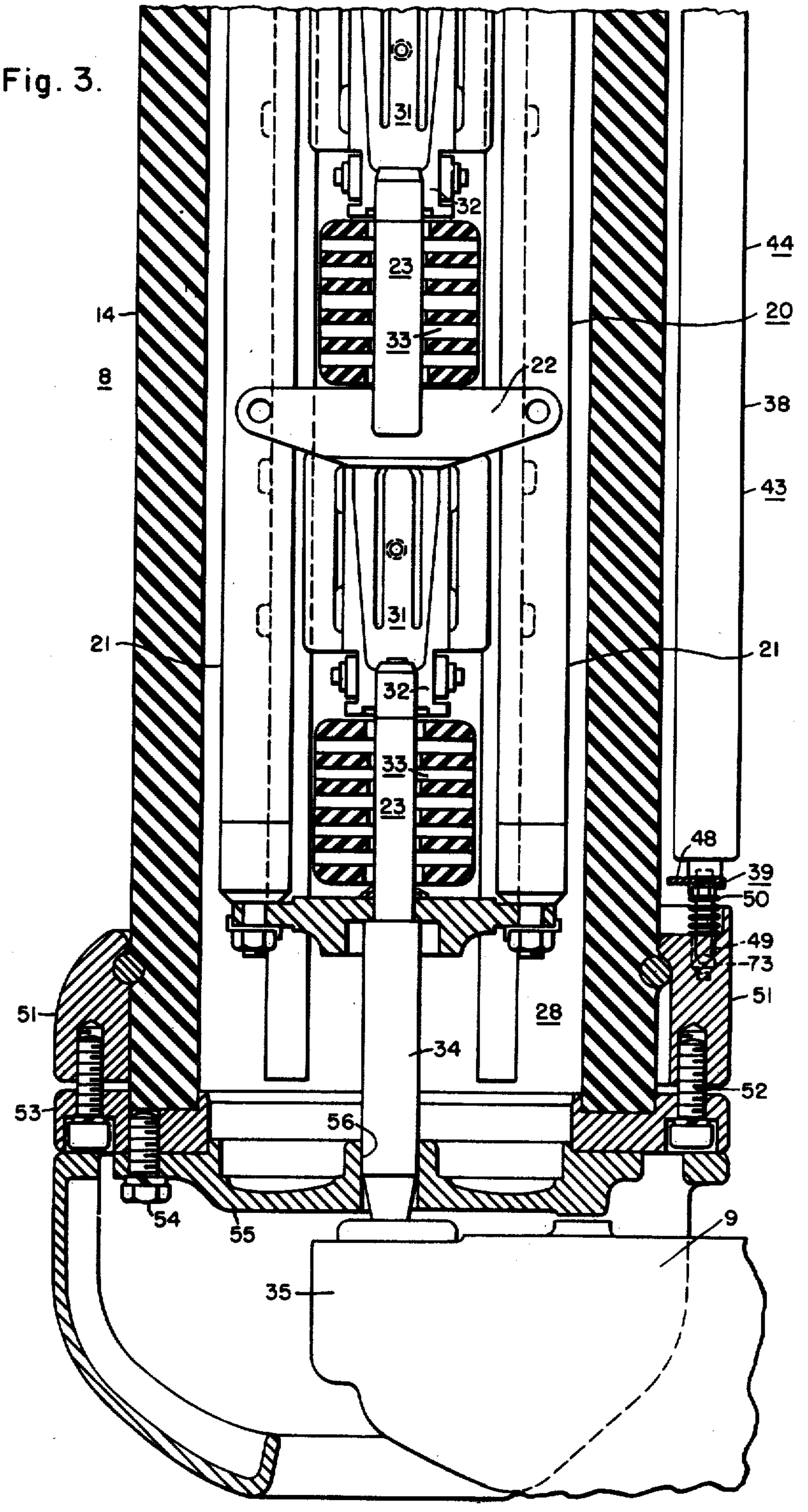
Fig. 3 is a view, similar to that of Fig. 2, but fragmentarily showing the lower portion of the same arc-extinguishing assemblage, again the contact structure being illustrated in the closed-circuit position.

Figs. 2 and 3 collectively illustrate the internal construction of each arc-extinguishing assemblage 8. With particular reference to Fig. 2, it will be observed that a contact foot 11 is threadedly secured to the lower end of the conductor stud 12 extending interiorly through the terminal bushing 5. The contact foot 11 is bolted to an upper dome casting 13, which not only closes the upper end of a tubular insulating casing 14, but also provides an interiorly disposed operating cylinder 15, within which vertically moves a liquid-pumping piston 16. The piston 16 rests upon a spring plate 17, the latter being biased downwardly by an accelerating compression spring 18.

A ladder-like movable contact assemblage 20 includes a pair of cooperating operating rods 21 interconnected by metallic crosspieces 22, the latter supporting a plurality of movable contacts 23. The upper ends of the operating rods 21 are joined by a cross-brace member 24, which abuts the spring plate 17 during the closing stroke, and hence charges the piston 16.

The piston 16 has a central hole 25, which accommodates a thrust member 26, which provides the lower seat for a battery of piston accelerating springs 27. Consequently, during the opening operation, upon downward movement of the ladder-like movable contact assemblage 20, the accelerating spring 18 assisting such motion, the piston springs 27 will force the thrust member 26 downwardly picking up the piston 16, after a predetermined delay, thereby placing the liquid disposed within the region 28, internally of the casing 14, under pressure, such piston motion occurring only during the interruption of relatively small currents. Associated with the upper movable contact 23 is a relatively stationary contact, designated by the reference numeral 29, and electrically connected by a conducting bracket 30 to the upper casting member 13.

There is provided a plurality of relatively stationary bridging contacts 31 (Figs. 3 and 9), the upper ends of which bear along the sides of the movable contacts 23, and the lower ends of which form relatively stationary contacts 32, which cooperate with the tips of the lower movable contacts 23. The arcs drawn between the three lower movable contacts 23 and their cooperating stationary contacts 32, and the arc drawn between the uppermost movable contact 23 and its cooperable stationary contact 29 are extinguished within a plurality of laterally positioned arc-extinguishing units, generally designated by the reference numeral 33, and preferably including a plurality of suitably configured plate members cemented and doweled together in contiguous relation. These insulating arc-extinguishing block members 33 extend diametrically directly across the interior of the casing 14, and the ends thereof extend out through openings provided in the side walls of the casing 14, as indicated in Figs. 1 and 4 of the drawings.

The lower movable contact 23 has an extension 34, which makes engagement with the extremity 35 of the conducting bridging member 9, as shown in Fig. 3. Thus, during the closing stroke the bridging member 9 moves upwardly, contacting the extensions 34 and driving the entire movable contact assemblage 20 upwardly against the opposition afforded by the accelerating compression spring 18, and also against the opposition exerted by the battery of piston springs 27. This not only effects contact reengagement between the several pairs of contacts 23, 31, but also charges the piston means, generally designated by the reference numeral 36, in Fig. 2.

The present invention is not particularly concerned with the contact structure or with the method of arc extinction. Reference may be had to U. S. patent application Serial No. 401,239, filed December 30, 1953, now United States Patent 2,816,991, issued December 17, 1957, to Robert E. Friedrich, and assigned to the assignee of the instant application. Also, reference may be had to a companion case specifically describing the contact structure, filed December 30, 1953, Serial No. 401,142, now United States Patent 2,790,880, issued April 30, 1957, to Fritz E. Florschutz and Carl G. Lentjes, and likewise assigned to the assignee of the instant application. These two patents describe the details of the contact structure and the arc-extinguishing units, and reference may be had to them for additional information pertaining to those features. For an understanding of our invention it is merely necessary to know that there is established, within the casing 14, a plurality of serially related breaks between the movable contacts 23 and the stationary contacts 29, 31, which arcs are extinguished within the passage structure provided by the grid blocks 33.

Our invention is particularly concerned with obtaining good voltage distribution, at both low and high frequencies, along the several breaks of the two arc-extinguishing assemblages 8 (Fig. 1) so that each of the arc-extinguishing units 33 assumes its proportionate burden of interrupting the circuit. Our invention is also concerned with good voltage distribution between the two arc-extinguishing assemblages 8 themselves. More particularly, our invention is concerned with a novel impedance shunting arrangement which may assume one of two forms. One form, shown in Figs. 1–8, provides an impedance shunting arrangement shunting all of the breaks of an arc-extinguishing assemblage 8 with no intermediate tapping points, whereas the other form, illustrated in Figs. 9–14, illustrates a form in which intermediate tapping points are provided, so that sections of the shunting impedance assemblage may be placed in parallel with the individual arc-extinguishing units 33 to insure thereby an equal voltage distribution within each arc-extinguishing assemblage 8, that is, between the arc-extinguishing units 33 associated therewith.

Figures 5, 6, 7, 8:
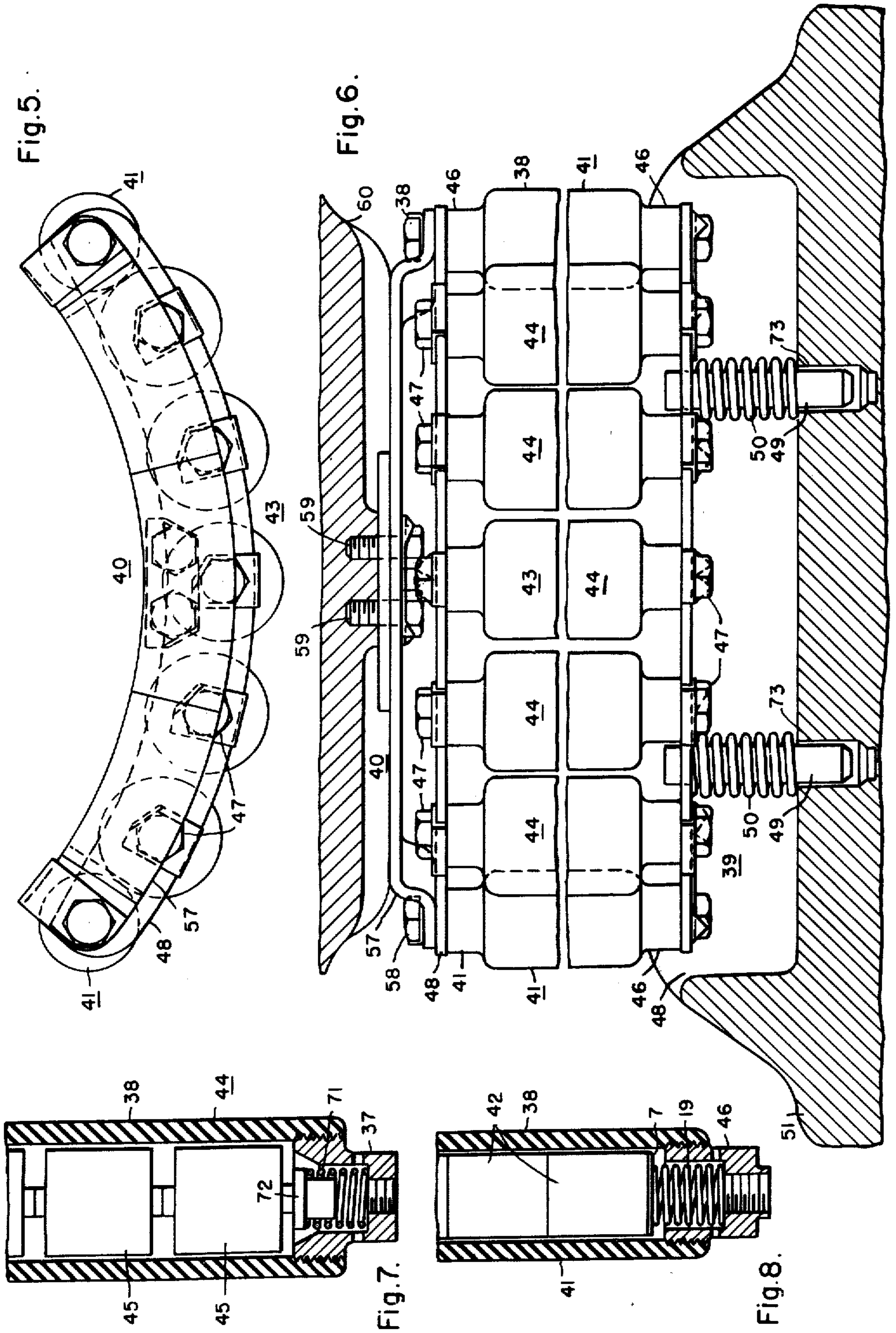
Fig. 5 is a top plan view of the shunting impedance assemblage used in conjunction with the arc-extinguishing assemblage of Figs. 2 and 3, and shown more particularly in Figs. 4 and 6 of the drawings.
Fig. 6 is a fragmentary, side elevational view showing only the ends of the tubular impedance elements illustrated in Figs. 4 and 5 of the drawings and the mounting construction therefor.
Figs. 7 and 8 are enlarged, fragmentary, sectional views through the ends of the resistance and capacitance tubular elements used in the impedance assemblage of Figs. 4 and 6.

Referring to the first embodiment of our invention, illustrated in Figs. 1–8, it will be observed that we have provided a tubular impedance shunting construction, in which a plurality of fiber tubes 38 are provided extending between mounting bracket assemblies 39, 40, more particularly shown in Figs. 4–8 of the drawings. The two outer fiber tubes 38, disposed in positions A and G in Fig. 4, are tubular resistance units, or elements, each element being generally designated by the reference numeral 41, and including a plurality of internally disposed superimposed resistance blocks 42. The resistance blocks 42 (Fig. 8) are of a carbon block type, and each resistance element 41 has, for the particular voltage and rating concerned with, a resistance value of approximately 50,000 ohms. There are 36 resistance blocks 41 in each tube 38. This totals approximately 2,000,000 ohms per resistance element 41. These values are given only by way of illustration for the particular breaker considered, and will naturally vary according to the voltage and current rating of the breaker. The resistance blocks 42 are positioned in end-to-end arrangement, as shown in Fig. 8, so that all of the resistance blocks 42 are in series between the end mounting brackets 39, 40. End caps 46, compression springs 19 and washers 7 resiliently maintain the resistance blocks 42 under compression, for good contacting engagement.

The remaining five elements, B through F, of the shunting impedance assemblage 43 are capacitance elements, designated by the reference numeral 44, and are composed of a plurality of superimposed ceramic capacitor blocks 45, more particularly shown in Fig. 12. Each capacitor block 45 has a capacitance of 500 micro-microfarads. There are 32 such blocks 45 in each tube 38 making a total capacitance for each capacitance element 44 of approximately 16 micro-microfarads. These values are given only by way of illustration for the particular breaker considered, and will vary according to the voltage rating of the breaker. End caps 37, compression springs 71 and metallic plugs 72 resiliently maintain the ceramic capacitor blocks 45 under compression, thereby insuring good contacting engagement therebetween. As observed in Figs. 7 and 8, each of the fiber tubes 38 is interiorly threaded at its ends, within which are threadedly secured the caps 37, 46, which have centrally disposed tapped apertures therein for accommodating mounting bolts 47. The several mounting bolts 47 fixedly secure the several fiber tubes 38 in position between the mounting bracket assemblies 39, 40, as shown more clearly in Fig. 6.

As more clearly shown in Figs. 4 and 6, the lower mounting bracket assembly 39 includes an arcuately-shaped strap 48 of conducting material having a pair of positioning dowel pins 49 of conducting material welded thereto. A compression spring 50 encircles each conducting dowel pin 49 and serves to resiliently mount the fiber tubes 38 in compression, as well as forming an electrical connection between the lower ends of the resistance and capacitance elements 41, 44 and the bolting ring 51, more clearly shown in Figs. 4 and 6 of the drawings. The bolting ring 51 has apertures 73 to accommodate the positioning dowel pins 49. The bolting ring 51 is electrically connected by mounting bolts 52 to an annular flange plate 53, which in turn is secured by bolts 54 to a lower closure plate 55 formed of conducting material.

As more clearly shown in Fig. 3, the extension 34 of the lower movable contact 23 extends in relatively close sliding relation through an aperture 56 centrally provided in the lower closure plate 55, so that, as a result, the lower mounting bracket assembly 39 is indirectly electrically connected to the lower movable contact 23 of the assemblage 8.

As more clearly shown in Figs. 5 and 6, the upper mounting bracket assembly 40 includes a second arcuate-shaped strap 48, to which mounting bolts 47 secure the resistance and capacitance elements 41, 44. Also, an additional U-shaped bracket strap 57 is bolted at 58 (Fig. 6) to the ends of the arcuately-shaped bracket strap 48. This U-shaped bracket strap 57 is mounted by additional bolts 59 to the upper bolting ring 60, which is secured by bolts 61 to the upper casting 13, and hence electrically connected to the upper relatively stationary contact 29 of the assemblage 8.

From the foregoing description it will be apparent that the shunting impedance assemblage 43 is electrically connected in parallel across the complete arc-extinguishing assemblage 8, with all its individual breaks, and is not provided with intermediate tapping points.

It will be observed that the shunting impedance assemblage 43 may be easily removed without disassembling the assemblage 8 by unscrewing the mounting bolts 59 from the upper bolting ring 60. The impedance assemblage 43 may then be moved slightly downwardly, compressing the springs 50, until the upper bracket assembly 40 may be moved laterally away from the bolting ring 60. Then the impedance assemblage may be lifted until the dowel pins 49 clear the apertures 73. Removal is then complete. If desired, another impedance assemblage, such, for example, as the one illustrated in Fig. 9, may be reinserted into place, the foregoing operations being performed in reverse order.

The compression springs 50, together with flexibility in the U-shaped bracket strap 57 at the top, serve to resiliently mount the impedance assemblage 43 in place on the arc-extinguishing assemblage 8, and to cushion the same from any shock occurring during circuit interrupter operation.

As mentioned, the shunting impedance assemblage 43 is used electrically in parallel with the arc-extinguishing assemblage 8 of the 330 kv. interrupter shown in Fig. 1, the three poles of which are adapted to interrupt 25,000,000 kva. Without such an arrangement there were severe voltage distribution problems across the several series breaks of the interrupters. The use of resistors or capacitors employed across a number of series breaks serves to make more nearly equal the recovery voltage, which appears across each gap following interruption.

The reason for the unequal distribution of voltage across the series breaks is believed to depend upon two factors. The first and most important factor is the capacity coupling of the live metal parts between breaks to the tank which is at ground potential. A second factor is believed to be the small leakage current over contaminated insulating surfaces bridging the contact members. This is generally negligible in oil circuit breakers of adequate design, but might be found occasionally in air blast breakers.

Referring more particularly to Fig. 15, which diagrammatically illustrates the inherent capacitance coupling situation immediately following an interruption, and before the conducting cross-bar 9 has separated from the extensions 34, or from the arc-extinguishing assemblages 8, it will be noted that there is a certain capacitance coupling between each of the contact breaks, designated by the reference numerals 1—8 in Fig. 15, and the grounded tank 1. There is a particularly large capacitance coupling $C_4$ between the movable cross-bar 9 and the grounded wall of the tank 1.

As well known by those skilled in the art, and as more particularly set forth in U. S. Patent 2,467,760, issued April 19, 1949, to Leon R. Ludwig, Benjamin P. Baker and Winthrop M. Leeds, referring particularly to Figs. 37 and 38 of said patent, upon a fault arising across the transmission line the result is, in effect, that one terminal of the interrupter is at ground potential, as is the tank "Y," whereas the other terminal "X" is at high potential, being connected to the high-voltage generating equipment. This state of affairs is illustrated in the interrupter of Fig. 15, where no special distribution means is provided.

It will be observed that there is capacitance to ground from the several contact portions between breaks 1—8 as one proceeds from the high voltage terminal "X" to the grounded terminal "Y." The voltage drop across each break following interruption is determined by the capacitance current passing therethrough times the impedance. The capacitance current in the first gap 1 next to the high voltage terminal "X" is greater than that in the next gap 2 proceeding to the grounded terminal "Y," by the amount of that in the capacitance $C_1$ to ground and so on as one goes from gap 1 to 8. Assuming approximately the same impedance Z across each gap, the IZ drop gets progressively less. The net result is that the breaks near to the high voltage terminal "X" have to assume more than their proportionate share of the recovery voltage.

This state of affairs is graphically brought out in Fig. 16, where the numerals 1–8 on the axis of abscissas indicate the number of the break being considered, whereas the numerals on the axis of ordinates refer to the percentage of the total pole-unit test voltage impressed on the particular individual break being considered. The cross-arm 9 is in contact with the extensions 34, as indicated, and the full line illustrates the situation for 1600 cycles, which is in the range of transient recovery voltage oscillations, which may prevail following interruption. The division of voltage between the interrupters was determined by connecting a glow tube of known breakdown value between the parts in question, and applying voltage to the entire breaker until the tube showed the first faint glow. The ratio of the known breakdown value of the tube to the total applied voltage is the percentage of the total voltage appearing between the parts in question.

The two curves in Fig. 16 were obtained with the breaker in the partially closed position, i. e., with the cross-arm touching the interrupters, but with the interrupter contacts fully open. At 60 cycles approximately 85% of the voltage appeared across breaks 1—4 with 15% across breaks 5—8. At 1600 cycles 94% of the voltage was across breaks 1—4 with only 6% across breaks 5—8. The distorting effect of the large cross-arm is apparent at both 60 and 1600 cycles. On the basis of capacitive coupling only, the unbalancing effect should be independent of frequency. It is believed that the 1600 cycle results are the more reliable because of the better response of the neon tube to higher values of charging current and also because surface leakage effects due to testing in air were of less importance at the higher frequency.

It is theoretically possible to parallel the interrupters with sufficient capacitance to correct almost entirely the voltage unbalance caused by the capacity coupling of the live metal parts between breaks to ground potential. However, practical limitations of cost and size of suitable capacitors, even those of the ceramic type described hereinafter, make it uneconomical to provide full correction by capacitance. Nevertheless, at least partial correction is still important so that steep wave front surges can be withstood by the insulation in parallel with the interrupter with the breaker in the partly open position. Adding a moderate amount of resistance will provide practically perfect voltage division at 60 cycle frequency and appreciable improvement even at 1600 cycle frequency so that each interrupter will take proper share of the recovery voltage during transmission line switching or fault interrupting duty. Thus, we have discovered that a combination of resistance and capacitance gives rise to a better balance of voltage distribution over a wide range of frequencies than when practical impedance assemblages 43 of either resistance or capacitance alone are used to shunt each arc-extinguishing assemblage 8.

To obtain for certain applications even better voltage distribution, that is, as between the individual breaks themselves in each arc-extinguishing assemblage 8, it is desirable to utilize a modified form of impedance shunting assemblage, designated by the reference numeral 62 in Fig. 9, which has provision for tapping sections thereof across the individual breaks themselves. This insures even better voltage control between the individual breaks within each arc-extinguishing assemblage 8. More particularly, referring to Figs. 9–14, it will be observed that the fiber tubes 38*a* have apertures 63 provided diametrically in the opposite walls thereof, which apertures 63 are spaced axially along the length of the tubes 38*a*, as indicated in Figs. 10, 13 and 14. The fiber tubes 38*a* are interiorly threaded at the ends to receive externally threaded conducting, tapped cap plugs 74. The tapped apertures 75 in the cap plugs 74 receive the mounting bolts 47 in the manner heretofore described.

The resistor blocks 42 and the ceramic capacitor blocks 45 are the same as those utilized heretofore. In addition, however, there are provided cooperating contact plugs 64, spring-biased together by compression springs 65, which accommodate a conducting tube 66, which may extend therethrough, in the manner indicated in Fig. 9 of the drawings. A conducting wire 67 may have one of its ends extending interiorly within one end of the conducting tube 66 and secured thereto by pressure. The other end of the conducting wire 67 may be electrically connected under the conducting head of the mounting bolt 68, which secures the bridging contact assemblage 69 in place, the latter flexibly mounting the bridging contact 31 in position. Reference may be had to the upper portion of Fig. 9 for this construction.

We have found it desirable to use two such wires 67 for each tapping connection, one end of each wire 67 being electrically connected to the bolt 68, there being two such bolts 68 for securing the two bridging contacts 31 of each bridging contact assemblage 69 in place. There is, of course, one bridging contact assemblage 69 on each side of the casing 14, as shown in Fig. 9.

We have discovered that by the use of ceramic capacitors a very high capacitance may be obtained within a relatively small space. In addition, the ceramic capacitor blocks or elements 45 are of a convenient size to position in end-to-end arrangement, as indicated in Figs. 4, 7 and 14 of the drawings. Fig. 12 illustrates one of the individual ceramic capacitor elements 45. Moreover, and most important, the liquid 3, or in this particular instance the oil, does not affect the ceramic capacitor elements 45, and the result is that they are particularly suitable for use in liquid-break circuit interrupters for voltage gradation purposes.

The capacitor block 45 has a plastic casing 76 which is impervious to the liquid. Inside of the casing 76 are two contact buttons 77, which engage the metallic coatings 78 at each end of the cylindrically-shaped ceramic capacitor body 79. The ceramic capacitor body 79 and the end metallic coatings therefor are shown in Fig. 11. The complete assembly with the plastic casing is shown in Fig. 12.

The capacitor body 79 has a very small size for its rating. It has the capacity of a large amount of stored energy ($E^2C$) per unit volume. We have observed no appreciable oil absorption by the ceramic body 79. It is also insensitive to large variation of frequency, having no inductance associated therewith. The s. i. c. value is between 3000 and 4000. Its power factor is also insensitive to frequency. It therefore is ideal for the present application. In the particular circuit breaker shown by way of illustration, each capacitor tube 70 (Fig. 14) has thirty-two 500 micro-microfarad capacitor units 45 in series.

Fig. 17 is a graph demonstrating the improvement in voltage distribution as a function of the number of capacitor tubes 70 which may be used with sections shunting each break, giving the percentage of pole unit voltage measured on the individual breaks. It will be observed that by paralleling one to five capactior tubes, the various points on the axis of abscissas represents zero, 62.5, 125, 187.5, 250, and 312.5 micro-microfarads paralleling each break. With this arrangement the percentage of total voltage applied to the high voltage interrupter (breaks 1–4, inclusive) are 94, 82, 72, 67, 65 and 63, respectively. It is apparent that the division of voltage among the four breaks 1–4 is improved, especially with the larger values of paralleling capacity.

The best combination, using only capacity balancing means is shown by reference numeral 77. In this case, five capacitor tube sections or 312.5 micro-microfarads were used across the end breaks 1 and 8, with only four tube sections or 250 micro-microfarads across breaks 2, 3, 4, 5, 6 and 7. We have discovered that the voltage distribution here is even better than with five tube sections across each break. This is the reason for using the modified capacitance tubular element 80 of Fig. 10, with its insulating filler rod 81 in position D of Fig. 9. The result is that only the outer break, 1 or 8 is shunted by an additional capacitor section.

Thus we have discovered that it is desirable to have less impedance across the end breaks 1, 8 than across the intervening breaks 2—7.

Fig. 18 shows the voltage distribution across the eight breaks with tapped balancing resistors and capacitors as used in the final design of the 330 kv. breaker, i. e., 0.25 megohm and 312.5 micro-microfarads across breaks 1 and 8, with 0.25 megohm and 250 micro-microfarads across breaks 2, 3, 4, 5, 6 and 7, with the breaker in the partially closed position. Measurements were made with oil in the breaker as well as with air. The curves indicate that at 60 cycles the voltage is divided very evenly between the eight breaks, both with oil and with air in the breaker, due primarily to the use of the resistors. At 1600 cycles the divsion is somewhat less uniform, yet is entirely satisfactory with both air and oil.

From the foregoing description of our invention it will be apparent that we have provided an improved impedance shunting arrangement, which physically requires little additional space, and which is particularly adaptable for tapping off to the individual breaks within each assemblage 8. By employing ceramic capacitor elements we have provided capacitance means of relatively high capacitance, which is impervious to oil, and which is particularly adapted for providing a relatively high capacitance in a small space, and yet being unusually suitable for employing the capacitor elements in end-to-end arrangement within relatively small size tubes.

We have also illustrated an improved mounting arrangement for the impedance means, and one which may be disassembled from the breaker in ready manner without necessitating any disassembly of several components of the breaker.

In addition, we have provided a combination resistance and capacitance assemblage in which the capacitance across the end breaks is greater than the capacitance across the intervening breaks. Moreover, when capacitance alone is employed, we have discovered that additional capacitance is required across the end breaks to obtain better voltage distribution than by applying the same amount of capacitance across each of a plurality of serially related breaks. In other words, less impedance is desirable across the end breaks 1, 8 than across the intervening breaks 2—7 for voltage distribution.

Finally, we have illustrated a novel tapping arrangement whereby good electrical connections may be readily made across sections of the shunting impedance assemblage.

Although we have shown and described specific structures, it is to be clearly understood that the same were merely for the purpose of illustration, and that changes and modifications may readily be made therein by those skilled in the art, without departing from the spirit and scope of the invention.

We claim as our invention:

1. A circuit interrupter including a plurality of cooperating pairs of contacts, means electrically connecting the pairs of contacts in series, means adding a shunting impedance for voltage distribution purposes across each of said pairs of contacts, and impedance means of less value across one outer pair of contacts adjacent a line terminal than across an intervening pair of contacts.

2. A circuit interrupter including a plurality of cooperating pairs of contacts, means electrically connecting the pairs of contacts in series, means adding a shunting impedance for voltage distribution purposes across each of said pairs of contacts, and impedance means of less value across the outer pairs of contacts adajacent the line terminals than across the intervening pairs of contacts.

3. The combination in a liquid break circuit interrupter of an arc-extinguishing assemblage including a substantially cylindrical casing, means for establishing one or more arcs within the casing, removable impedance means shunting one or more of the arcs including a plurality of substantially parallel closely spaced tubes extending axially of the casing and positioned externally thereof, means supporting the plurality of tubes together as a unit, said supporting means being removably secured to one side only of said cylindrical casing, and said closely spaced tubes being mounted along the arc of a circle concentric with said casing.

4. The combination in a circuit interrupter of an arc-extinguishing assemblage including a substantially cylindrical casing, means for establishing one or more arcs within the casing, impedance elements shunting one or more of the arcs and enclosed within a plurality of substantially parallel closely spaced tubes extending axially of the casing and positioned externally thereof, the impedance elements being arranged serially in position within said tubes, and an arcuately-shaped mounting bracket removably secured to said casing disposed at at least one of the ends of the tubes.

5. The combination in a circuit interrupter of an arc-extinguishing assemblage including a substantially cylindrical casing, means for establishing one or more arcs within the casing, impedance elements shunting one or more of the arcs and enclosed within a plurality of substantially parallel closely spaced tubes extending axially of the casing and positioned externally thereof, the impedance elements being arranged serially in position within said tubes, a pair of arcuately-shaped bracket members disposed at opposite ends of the tubes, means mounting the tubes to the bracket members, and means for removably securing the bracket members adjacent the opposite ends of the casing along one side only thereof.

6. The combination in a liquid-break circuit interrupter of an arc-extinguishing assemblage including a substantially cylindrical casing, means for establishing one or more arcs within the casing, and impedance elements shunting one or more of the arcs and enclosed within a plurality of substantially parallel closely spaced tubes extending axially of the casing and positioned externally thereof, the impedance elements being arranged serially in position within said tubes, and one or more of the tubes enclosing resistance elements positioned end-to-end whereas one or more other tubes enclose capacitance elements positioned end-to-end.

7. A circuit interrupter including means for establishing a plurality of serially related arcs, and tubular capacitance means including a plurality of end-to-end ceramic capacitance elements in block form shunting one or more of the arcs for voltage control.

8. A liquid-break circuit interrupter including an arc-extinguishing assemblage, means for establishing one or more arcs within the assemblage, and ceramic capacitance means in elemental block form immersed in the liquid for controlling the voltage across one or more of the arcs.

9. The combination in a circuit interrupter of an arc-extinguishing assemblage, contact means in the assemblage for establishing a plurality of serially related arcs, a plurality of impedance tubes shunting the arcs and having tapping apertures spaced therealong axially of the tubes in registering relation, one or more of said impedance tubes having disposed therein a plurality of serially arranged impedance elements in elemental block form, and connecting means passing through the tapping apertures between an adjacent pair of impedance elements and electrically connecting sections of the impedance tubes across the contact means.

10. The combination in a circuit interrupter of an arc-extinguishing assemblage, contact means in the assemblage for establishing a plurality of serially related arcs, a plurality of impedance tubes shunting the arcs and having tapping apertures spaced therealong axially of the tubes, one or more of said impedance tubes having disposed therein a plurality of serially arranged impedance elements in elemental block form, contacts disposed interiorly of the tubes adjacent the tapping apertures, and connecting means passing through the tapping apertures and electrically connecting sections of the impedance tubes across the contact means.

References Cited in the file of this patent

UNITED STATES PATENTS

| | | |
|---|---|---|
| 1,825,150 | Jansson | Sept. 29, 1931 |
| 2,160,630 | Van Sickle et al. | May 30, 1939 |
| 2,291,263 | Thommen | July 28, 1942 |
| 2,336,316 | Thommen | Dec. 7, 1943 |
| 2,462,795 | Webb et al. | Feb. 22, 1949 |
| 2,467,760 | Ludwig et al. | Apr. 19, 1949 |
| 2,513,918 | Coggeshall | July 4, 1950 |
| 2,752,459 | Taylor et al. | June 26, 1956 |